United States Patent
Briscoe et al.

(10) Patent No.: US 10,533,843 B2
(45) Date of Patent: Jan. 14, 2020

(54) METHOD FOR MEASURING A TRUE CONCENTRICITY OF A ROTATING SHAFT

(71) Applicant: Ford Motor Company, Dearborn, MI (US)

(72) Inventors: Mark Briscoe, Milford, MI (US); Robert Kraus, Shelby Township, MI (US); Jason Savage, South Lyon, MI (US); Katelyn Reno Shelley, Farmington, MI (US); Lucas Michael Vanderpool, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 15/867,761

(22) Filed: Jan. 11, 2018

(65) Prior Publication Data
US 2019/0212133 A1    Jul. 11, 2019

(51) Int. Cl.
| | |
|---|---|
| G01B 11/24 | (2006.01) |
| G01B 11/245 | (2006.01) |
| G01B 11/27 | (2006.01) |
| G01M 1/16 | (2006.01) |

(52) U.S. Cl.
CPC ........ *G01B 11/2408* (2013.01); *G01B 11/245* (2013.01); *G01B 11/2416* (2013.01); *G01B 11/27* (2013.01); *G01M 1/16* (2013.01)

(58) Field of Classification Search
CPC ... G01B 11/2408; G01B 11/2416; G01M 1/16
USPC ................................................ 356/600–640
See application file for complete search history.

(56) References Cited

U.S. PATENT DOCUMENTS

| | | | |
|---|---|---|---|
| 5,140,534 A | 8/1992 | Miller et al. | |
| 5,390,151 A | * 2/1995 | Ozawa | G01B 7/312 250/231.17 |
| 5,734,108 A | * 3/1998 | Walker | G01H 9/00 73/650 |
| 5,796,485 A | 8/1998 | Dassler et al. | |
| (Continued) | | | |

FOREIGN PATENT DOCUMENTS

| | | |
|---|---|---|
| CN | 103994717 | 8/2014 |
| CN | 204154297 | 2/2015 |
| (Continued) | | |

OTHER PUBLICATIONS

Simm, A.et al., Laser Based Measurement for the Monitoring of Shaft Misalignment, Measurement, vol. 87, pp. 104-116, Elsevier Publishing, 2016, available at URL http://www.sciencedirect.com/science/article/pii/S0263224116001111.

(Continued)

*Primary Examiner* — Tri T Ton
(74) *Attorney, Agent, or Firm* — Burris Law, PLLC

(57) ABSTRACT

The present disclosure is directed toward a method for measuring a true concentricity of a rotating shaft. The method includes simultaneously measuring, with diametrically opposed position sensors, opposite sides of the rotating shaft at an initial state to acquire a first measurement data and at a 180-degree rotation to acquire a second measurement data. The method further determines a rotational centerline and a shaft centerline based on the first and second measurement data, and calculates a concentricity error of the rotating shaft based on the determined rotational centerline and the shaft centerline.

20 Claims, 4 Drawing Sheets

(56) References Cited

U.S. PATENT DOCUMENTS

| | | | |
|---|---|---|---|
| 7,210,321 B2 | 5/2007 | George | |
| 2004/0226336 A1* | 11/2004 | George | B21D 3/16 |
| | | | 72/362 |
| 2011/0207578 A1* | 8/2011 | Lee | G01D 5/04 |
| | | | 477/34 |
| 2013/0008249 A1* | 1/2013 | Sotgiu | G01M 1/225 |
| | | | 73/462 |
| 2013/0282328 A1 | 10/2013 | Sato et al. | |
| 2015/0338240 A1 | 11/2015 | Jiang et al. | |

FOREIGN PATENT DOCUMENTS

| | | |
|---|---|---|
| JP | H07324921 | 12/1995 |
| JP | 2009156770 | 7/2009 |

OTHER PUBLICATIONS

Aeroel Marposs product page, Meclab & Supermeclab—The Quality Control Laser Gauge, available at URL http://www.aeroel.it/products/meclab-bench-top-laser-laser-micrometers-for-diameter-measurement.html.

* cited by examiner

METHOD FOR MEASURING A TRUE CONCENTRICITY OF A ROTATING SHAFT

FIELD

The present disclosure relates to a method for measuring a true concentricity of a rotating shaft.

BACKGROUND

The statements in this section merely provide background information related to the present disclosure and may not constitute prior art.

In many rotating gear applications, a first order imbalance is detected and controlled by measuring a runout of the gear. For example, in driveline applications, the first order imbalance is controlled by measuring the combined axial and radial runout of the rear axle input flange. However, such standard measurement is not applicable to a gear assembly having a flangeless connection.

More particularly, in one example, runout is defined as the difference between the high and low measurement of a rotating shaft under a dial indicator. The runout measurement measures both circularity (i.e., form error) and concentricity (i.e., positional error). In a rotating gear assembly having a flangeless connection (e.g., a plug-in system), the form error of the mating parts is not critical because, when assembled, the male and female parts do not rotate relative to each other, such that errors in roundness may not affect system balance. In addition, it may be unnecessary to measure the runout of a non-round shaft since any deviation in circularity is directly translated to the part. For example, for a splined shaft or a shaft with a keyway, the measurement data would need to be filtered to inhibit the non-round areas from affecting the measurement or a round gauge surface is added to the part to represent the position of the actual functional surface. This is seen in instances where a shaft is measured above or below a splined area to establish runout.

Accordingly, the positional error between the shaft geometric centerline and the shaft axis of rotation becomes a key factor in determining imbalance. However, current measurement techniques measure the concentricity as part of circularity and thus, the runout is generally measured and then the concentricity is extracted from the runout. These and other issues are addressed by the teaching of the present disclosure.

SUMMARY

This section provides a general summary of the disclosure, and is not a comprehensive disclosure of its full scope or all of its features.

In one form, the present disclosure discloses a method for measuring a true concentricity of a rotating shaft. The method includes simultaneously measuring, with diametrically opposed position sensors, opposite sides of the rotating shaft at an initial state to acquire a first measurement data and at a 180-degree rotation to acquire a second measurement data. The method further determines a rotational centerline and a shaft centerline based on the first and second measurement data, and calculate a concentricity error of the rotating shaft based on the determined rotational centerline and the shaft centerline.

In another form, the rotating shaft has a spline portion at one end and a gear at the other end, and the position sensors are configured to measure opposite sides of the spline portion of the rotating shaft.

In yet another form, the method further includes driving the gear portion of the rotating shaft.

In one form, a two-dimensional optical micrometer is provided as the position sensors for measuring the opposite sides of the rotating shaft.

In another form, the method further includes simultaneously re-measuring the opposite sides of the rotating shaft at the initial state position and at the 180-degree rotation multiple times to acquire multiple first measurement data and multiple second measurement data; determining an average rotational centerline and an average shaft centerline based on the multiple first measurement data and the multiple second measurement data; and calculating an average concentricity error of the rotating shaft based on the average rotational centerline and the average shaft centerline.

In yet another form, the first measurement data and the second measurement data include positional measurements of the opposite sides of the rotating shaft relative to the position sensors. The determining the rotational centerline and the shaft centerline further includes: measuring a diameter of a rotational path of the shaft based on the positional measurements of the first measurement data and the second measurement data; calculating the rotational centerline based on the diameter of the rotational path; measuring a shaft diameter based on the positional measurements of one of the first measurement data or the second measurement data; and calculating the shaft centerline based on the shaft diameter.

In one form, the measuring the shaft diameter further includes measuring a first shaft diameter based on the first measurement data, and measuring a second shaft diameter based on the second measurement data. The calculating the shaft centerline further includes calculating a first shaft centerline based on the first shaft diameter, and calculating a second shaft centerline based on the second shaft diameter. The concentricity error is calculated based on the first shaft centerline, the second shaft centerline, and the rotational centerline.

In another form, the shaft includes a plurality of splines, and the simultaneously measuring the opposite sides of the rotating shaft further includes simultaneously measuring a position of a pair of splines located on opposite sides of the shaft.

In yet another form, the shaft includes a plurality of pair of splines located on opposite sides of the shaft, and the first and second measurement data includes the position of each pair of splines measured simultaneously when a pair is at the initial state and at the 180-degree rotation.

In one form, the rotating shaft has a non-circular portion at one end and a gear at the other end, and the position sensors are configured to measure opposite sides of the non-circular portion of the rotating shaft.

In one form, the present disclosure is directed toward a method for measuring a true concentricity of a shaft. The method includes rotating the shaft for at least one full rotation; simultaneously measuring, with a two-dimensional optical sensor, opposite sides of the shaft to acquire a first measurement data as the shaft rotates from zero to 180 degrees and a second measurement data as the shaft rotates from 180 to 360 degrees; determining a rotational centerline based on the first measurement data and the second measurement data; determining one or more shaft centerlines based on at least one of the first measurement data or the second measurement data; and calculating a concentricity error of the shaft based on the rotational centerline and the one or more rotating shaft centerlines.

In another form, the shaft has a spline portion with a plurality of splines, and a gear portion opposite the spline portion. The spline portion is positioned between two diametrically opposing sensors of the two-dimensional optical sensor, and the rotating the shaft further includes driving the gear portion of the shaft.

In yet another form, the simultaneously measuring the opposite side further includes: simultaneously measuring a pair of splines disposed on opposite sides of the shaft as the shaft rotates. One or more pairs of splines are simultaneously measured. The first measurement data includes position of each pair of splines as the shaft rotates from zero to 180 degrees, and the second measurement data includes position of each pair of splines as the shaft rotates from 180 to 360 degrees.

In one form, the method further includes: measuring a maximum distance between the opposite sides of the shaft based on the first and second measurement data; and calculating the rotational centerline based on the maximum distance.

In another form, the first measurement data and the second measurement data include positional measurements of the opposite sides of the rotating shaft relative to the two-dimensional optical sensor. The determining one or more rotating shaft centerlines further includes measuring a first shaft diameter and a second shaft diameter. The first shaft diameter is measured based on the positional measurements of the opposite sides of the shaft acquired in the first measurement data, and the second shaft diameter is measured based on the positional measurements of the opposites sides of the shaft acquired in the second measurement data. The method further includes calculating a first shaft centerline based on the first shaft diameter, and calculating a second shaft centerline based on the second shaft diameter. The concentricity error is calculated based on the first shaft centerline, the second shaft centerline, and the rotational centerline.

In yet another form, the method further includes tracking movement of the shaft as the shaft is rotating and being simultaneously measured.

In one form, the present disclosure is directed toward a method for measuring a true concentricity of a shaft. The method includes: driving the shaft at a first end; simultaneously measuring, with a laser sensor, position of opposing sides of a second end of the shaft to acquire a first measurement data with the opposing sides at an initial state and a second measurement data with the opposing sides transposed; and calculating a concentricity error of the shaft based on the first and second measurement data.

In another form, the method further includes: determining a rotational centerline based on the first measurement data and the second measurement data; and determining one or more shaft centerlines based on at least one of the first measurement data or the second measurement data.

In yet another form, the first end of the shaft is a gear and the second end is a spline portion having a plurality of splines. The laser sensor simultaneously measures opposing splines of the spline portion.

In one form, the spline portion has multiple pairs of opposing splines, and the first and second measurement data includes the position of each pair of opposing splines measured simultaneously when the pair are at the initial state and are transposed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
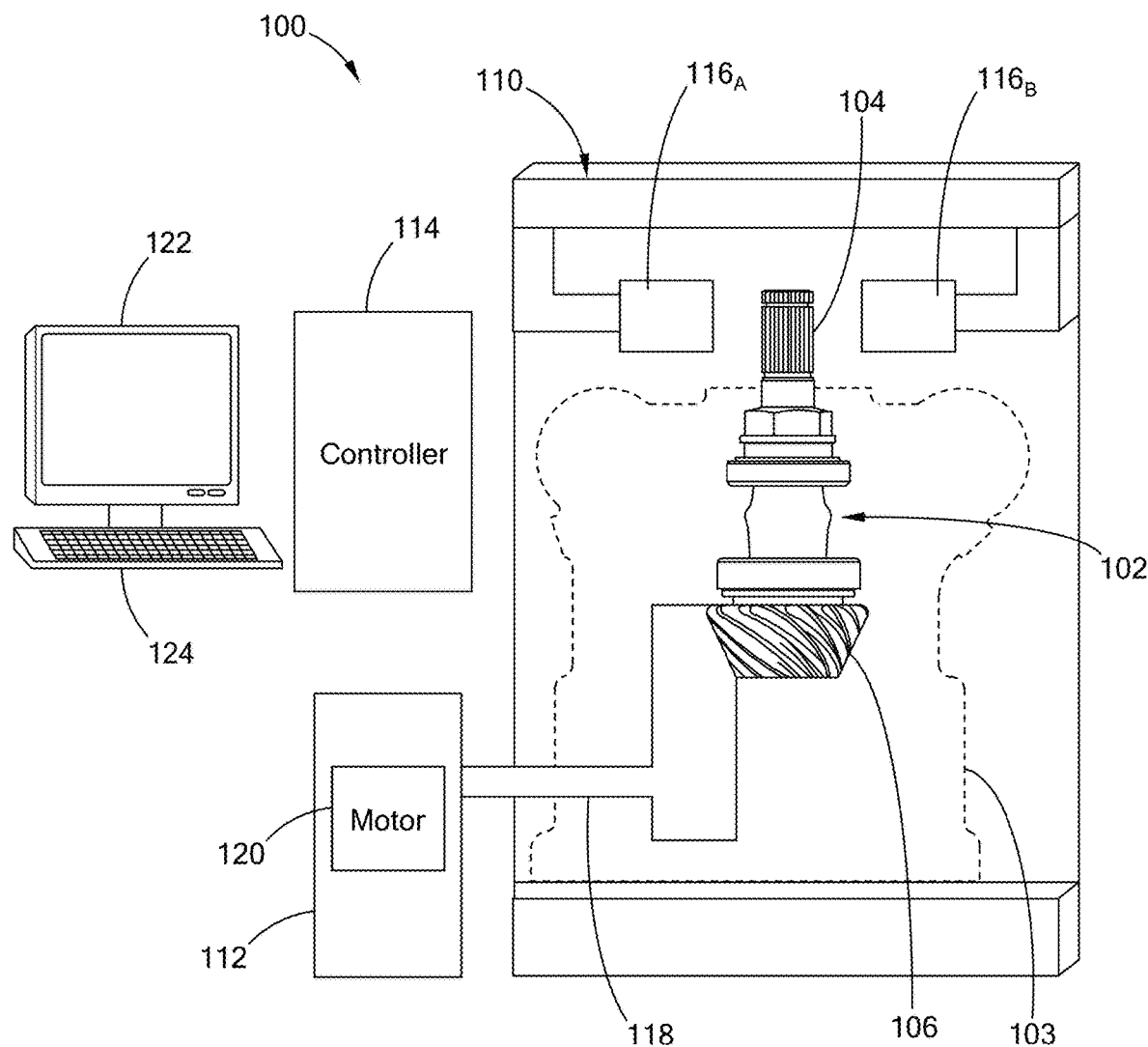
FIG. 1 illustrates a system for measuring a true concentricity error of a shaft in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A true positional error of a rotating shaft, which may also be referred to a true concentricity error of the shaft, is determined based on a geometric centerline of the shaft ("shaft centerline" hereinafter) and an axis of rotation of the shaft ("rotational centerline" hereinafter). Referring to FIG. 1, a system 100 measures a true concentricity error of a shaft 102 in accordance with the teachings of the present disclosure. Here, the shaft 102 is positioned in a casing 103 and is a pinion shaft that couples to a ring gear (not shown) of a drive axle assembly (i.e., differential assembly) of a vehicle. Generally, the shaft 102 includes a drive input 104 (i.e., torque input) at one end of the shaft 102 and a gear 106 provided at the other end of the shaft 102 opposite of the drive input 104. The drive input 104 may be configured in various suitable ways. In one form, the drive input 104 may be non-circular. In yet another form, as illustrated in the figure, the drive input 104 has multiple splines and thus, may be referred to as a spline portion 104 hereinafter. The teachings of the present disclosure are applicable to other rotatable shafts or components, and should not be limited to the shaft illustrated in the figures.

The system 100 includes a position sensor device 110, a shaft drive device 112, and a controller 114. The position sensor device 110 includes diametrically opposed sensors 116A and 116B that are arranged on opposite sides of the shaft 102 to simultaneously measure opposite sides of the shaft 102 as the shaft 102 rotates. For example, the position sensor device 110 is arranged about the spline portion 104 of the shaft 102 to measure opposite sides of the spline portion 104.

In one form, the position sensor device 110 is a two-dimensional (2D) optical micrometer that has a light transmitter arranged on one side of the spline portion 104 and a receiver arranged on the other side of the spline portion 104. The transmitter and the receiver operate as the diametrically opposed sensors 116A and 116B arranged on opposite sides of the shaft 102. The transmitter generates and emits light toward the spline portion 104 and the receiver receives light not blocked by the spline portion 104 to measure opposite sides of the spline portion 104. The position sensor device 110 is operable to measure the position of the opposite side of the spline portion 104 relative to the sensor device 110. In one form, the position sensor device 110 continuously measures the position of the opposite sides as the shaft 102 is being rotated. In addition, the position sensor device 110 may measure multiple locations along the length of the spline portion 104 of the shaft 102.

The shaft drive device 112 is operable to rotate the shaft 102 by applying a drive force at a section of the shaft 102 that is not being measured by the position sensor device 110. More particularly, the end of the shaft 102 that is being measured (e.g., the spline portion) is unrestricted to provide an accurate measurement of the true concentricity of the shaft 102. For example, in one form the shaft drive device 112 may include a gear attachment member 118 that engages with the gear 106 of the shaft 102 and a motor 120 that is operable to rotate the gear 106 by way of the gear attachment member 118. In another example, for a differential assembly, if the ring gear is provided within a casing housing the pinion shaft, the shaft drive device is configured to drive the ring gear which in return drives the shaft 102. While the gear attachment member 118 is illustrated to interface with only a side portion of the gear 106, the gear attachment member 118 may also be configured to interface with the flat end or flat face of the gear 106 to rotate the shaft 102. For example, the gear attachment member 118 may have a hex-head feature, a rubber ball, and/or other frictional surface for interfacing with the flat end of the gear 106. The speed at which the shaft drive device 112 rotates the shaft 102 is determined based on the measurement rate of the position sensor device 110.

The controller 114 is a computer that includes, for examples, a processor, memory, and a communication interface to communicate with external components, such as user interfaces (e.g., monitor 122 and keyboard 124) and other devices of the system 100. For example, the communication interface is configured to communicably couple the controller 114 via a wireless communication link (e.g., BLUETOOTH, ZIGBEE, WI-FI) and/or wired communication link (e.g., cable). The user interfaces are operable by an operator of the system 100 to control the system 100.

In one form, the controller 114 is communicably coupled to the position sensor device 110 to acquire measurement information and to the shaft drive device 112 to control the rotation of the shaft 102. The controller 114 is configured to determine a true concentricity of the shaft 102 based on measurements received from the position sensor device 110. In one form, the measurements taken provide the position of the opposing sides of the shaft 102 relative to the position sensor device 110, diametrical information of the shaft based on the position data, and/or other suitable measurements.

More particularly, the true concentricity error is provided as the difference between two centerlines. For example, referring to FIG. 2, a spline portion 200 of a shaft is illustrated at three different rotational positions identified as A, B, and C. The spline portion 200 has a first spline $202_1$ and a second spline $202_2$, which are collectively referred to as splines 202. The spline portion 200 defines a rotational path 204 defined by the outermost spline of the spline portion 200 as the shaft rotates. For purpose of explanation, the rotational path 204 is illustrated as a circle, but is not limited to such shape. A rotational axis 208 of the shaft is based on the rotational path 204, or more particularly, the position of outermost spline measured of the rotating shaft. The shaft centerline is based on the position of opposing splines 202 at any of the rotational positions. For example, in FIG. 2, the shaft centerline at positions A, B, and C, are identified as $210_A$, $210_B$, and $210_C$, respectively, and collectively referred to as shaft centerlines 210. The true concentricity error of the shaft is a deviation between a respective shaft centerline 210 and the rotational axis 208. For example, a true concentricity error with respect to position B is identified as $212_B$. In one form, an average concentricity error is determined based on the error calculated for shaft centerline.

Figure 2:
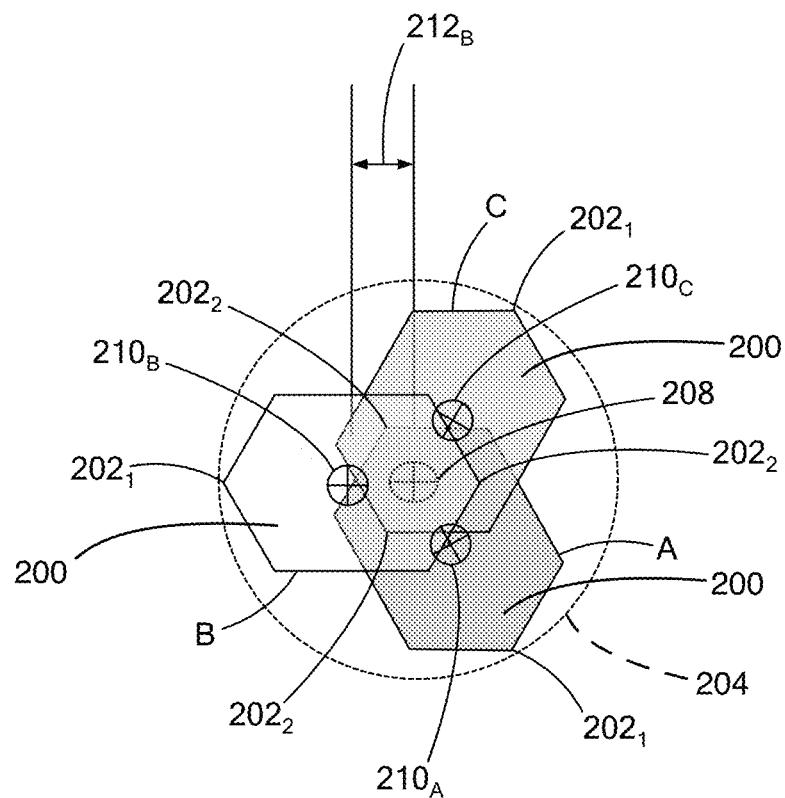
FIG. 2 illustrates a top view of a spline portion of shaft at three different rotational positions in accordance with the teachings of the present disclosure.
Figure 3:
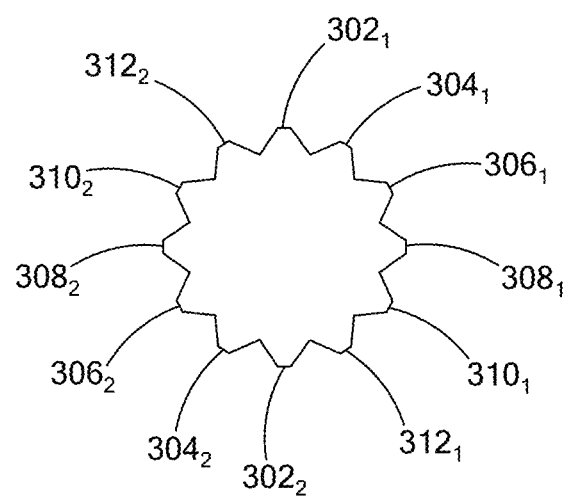
FIG. 3 illustrates a spline portion having two or more opposing spline pairs in accordance with the teachings of the present disclosure.

While the spline portion of FIG. 2 illustrates only one pair of opposing splines (i.e., splines 202), the true concentricity of a shaft having more than two splines is also within the scope of the present disclosure. For example, FIG. 3 illustrates a top view of a spline portion 300 having six pairs of opposing splines, where a respective pair are identified by the same base reference number. For example, FIG. 3 illustrate opposing splines: $302_1$ and $302_2$; $304_1$ and $304_2$; $306_1$ and $306_2$; $308_1$ and $308_2$; $310_1$ and $310_2$; and $312_1$ and $312_2$.

To determine the true concentricity, the position of at least one pair of opposing sides of the shaft is measured simultaneously and at least two different rotational positions. The measurements are used to determine the rotational centerline by identifying the outermost measured positions of the two opposing sides, and to determine one or more shaft centerlines based on the simultaneously measured positions of opposite sides of the shaft.

In one form, opposite sides of a rotating shaft are measured at the same time at an initial position, and then again 180 degrees out of phase. Accordingly, each side of the shaft is measured twice. For example, referring to FIG. 4, the spline portion 200 is arranged between the sensors $116_A$ and $116_B$ of the position sensor device 110 to have two opposite sides measured relative to the sensor device 110. The position sensor device 110 measures the position of the splines 202 at an initial state provided by the dotted-line outline of the spline portion 200, which is identified by reference "A" in FIG. 4. The position of the first spline $202_1$ is provided as A1 and the position of the second spline $202_2$ is provided as A2. The measurements taken with the splines 202 at the initial state may be provided as first measurement data.

Figure 4:
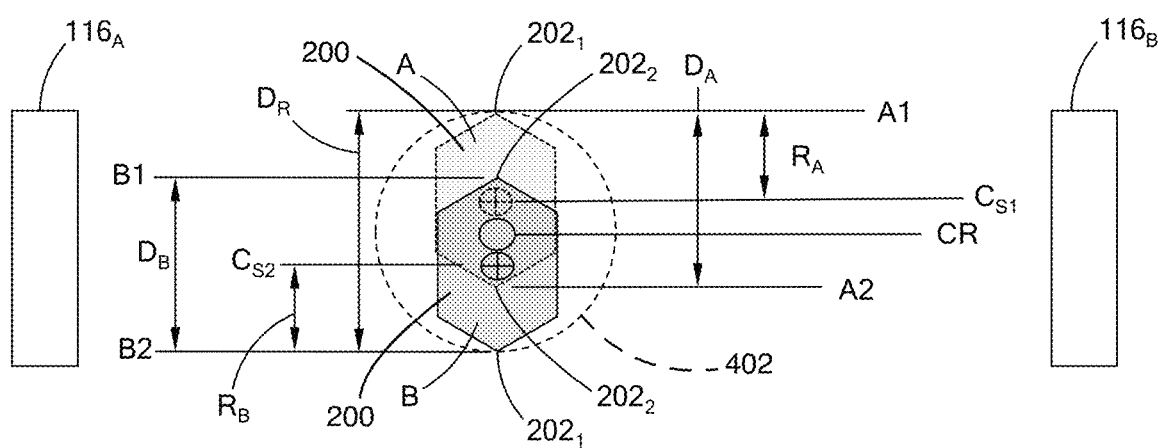
FIG. 4 illustrate measurement of a spline portion for determining true concentricity error in accordance with the teachings of the present disclosure.

The spline portion 200 of the shaft is rotated 180-degrees such that the splines 202 are on opposite sides, as illustrated by the solid-line outline of the spline portion 200, which is identified by reference "B" in FIG. 4. The position of the first spline $202_1$ is provided as B2 and the position of the second spline $202_2$ is provided as B1. The measurements taken with the splines 202 being 180-degrees out of phase from the initial state may be referred to as second measurement data.

If the spline portion has multiple pairs of opposing splines, such as the one illustrated in FIG. 3, each pair of opposing splines is measured at the initial state and then when the respective pair is 180-degrees out of phase from the initial state. For example, in one form, the controller 114 is configured to track the pair of opposing splines as the shaft rotates to measure each pair of opposing splines twice. In particular, for the six pair of opposing splines of FIG. 3, the controller 114 may track the splines by way of a counter such that if the counter reaches 7, the controller 114 determines that each pair has been measured at the initial state and the measurements taken are provided as first measurement data. The counter may then be reset or may continue to be incremented such when the counter reaches 7 or 13, respectively, the controller 114 determines that each pair was rotated 180-degrees out of phase and measured a second time. The measurements taken are provided as second measurement data. Other suitable method for tracking the various opposing sides may be used and should not be limited to the example described herein.

Using the first measurement data and the second measurement data for a given pair of opposing sides, the rotational centerline and the shaft centerline are determined and then used to determine the true concentricity error. In one form, in determining the rotational centerline, a diameter of a rotational path of the shaft is determined based on the first measurement data and the second measurement data. For example, referring to FIG. 4, a diameter (Dr) of a rotational path 402 of the spinal portion 200 is determined based on the outermost positions measured for each opposing side provided in the first and second measurement data. In other words, the rotational centerline is based on the distance of two extreme measurement points at opposite sides of the spline portion 202. In FIG. 4, these measurements are identified as A1 and B2, and the rotational centerline ($C_R$) may be calculated based on one of Equation 1 or 2.

$$C_R = \left(\frac{(A1 - B2)}{2}\right) + B2 \qquad \text{Equation 1}$$

$$C_R = A1 - \left(\frac{(A1 - B2)}{2}\right) \qquad \text{Equation 2}$$

A shaft centerline ($C_S$) is determined based on the simultaneous measurements taken of the opposite sides of the shaft. In particular, a first shaft centerline ($C_{S1}$) is determined based on the position of the opposing sides at the initial state, as provided in the first measurement data, and a second shaft centerline ($C_{S2}$) is determined based on the position of the opposing sides rotated 180 degrees from the initial state, as provided in the second measurement data. The shaft centerline can be calculated in various suitable ways using the measurement data. For example, in one form, the shaft centerline can be calculated using one of the following equations in which P1 is the position of the first side and P2 is the position of the second side, where P1 and P2 were simultaneously measured and P2 is less than that of P1. For example, for the first measurement data P1 is A1 and P2 is A2, and for the second measurement data P1 is B2 and P2 is B1.

$$C_S = \left(\frac{(P1 - P2)}{2}\right) + P2 \qquad \text{Equation 3}$$

$$C_S = P1 - \left(\frac{(P1 - P2)}{2}\right) \qquad \text{Equation 4}$$

The shaft centerline can be determined for each simultaneous measurement acquired for each pair of opposing sides of the shaft. Thus, if the spline portion has multiple pairs of opposing sides, a shaft centerline can be determined for each opposing pair for each measurement captured in the first measurement data and the second measurement data for the respective spline pair.

Using the shaft centerline and the rotational centerline, a true concentricity error (TCE) is determined using Equation 5 for each of the shaft centerlines calculated. In one form, a true concentricity error is calculated for each shaft centerline and the calculated true concentricity errors may then be averaged.

$$\text{TCE} = C_S - C_R \qquad \text{Equation 5}$$

To assess whether the shaft is imbalanced, the averaged true concentricity error and/or one or more of the true concentricity errors are compared to a preset tolerance for the shaft being measured. For example, if the tolerance is a range, the shaft is identified as balanced if the true concentricity error is within the range. Other suitable methods for determining whether the shaft is balanced based on true concentricity may also be used.

Figure 5:
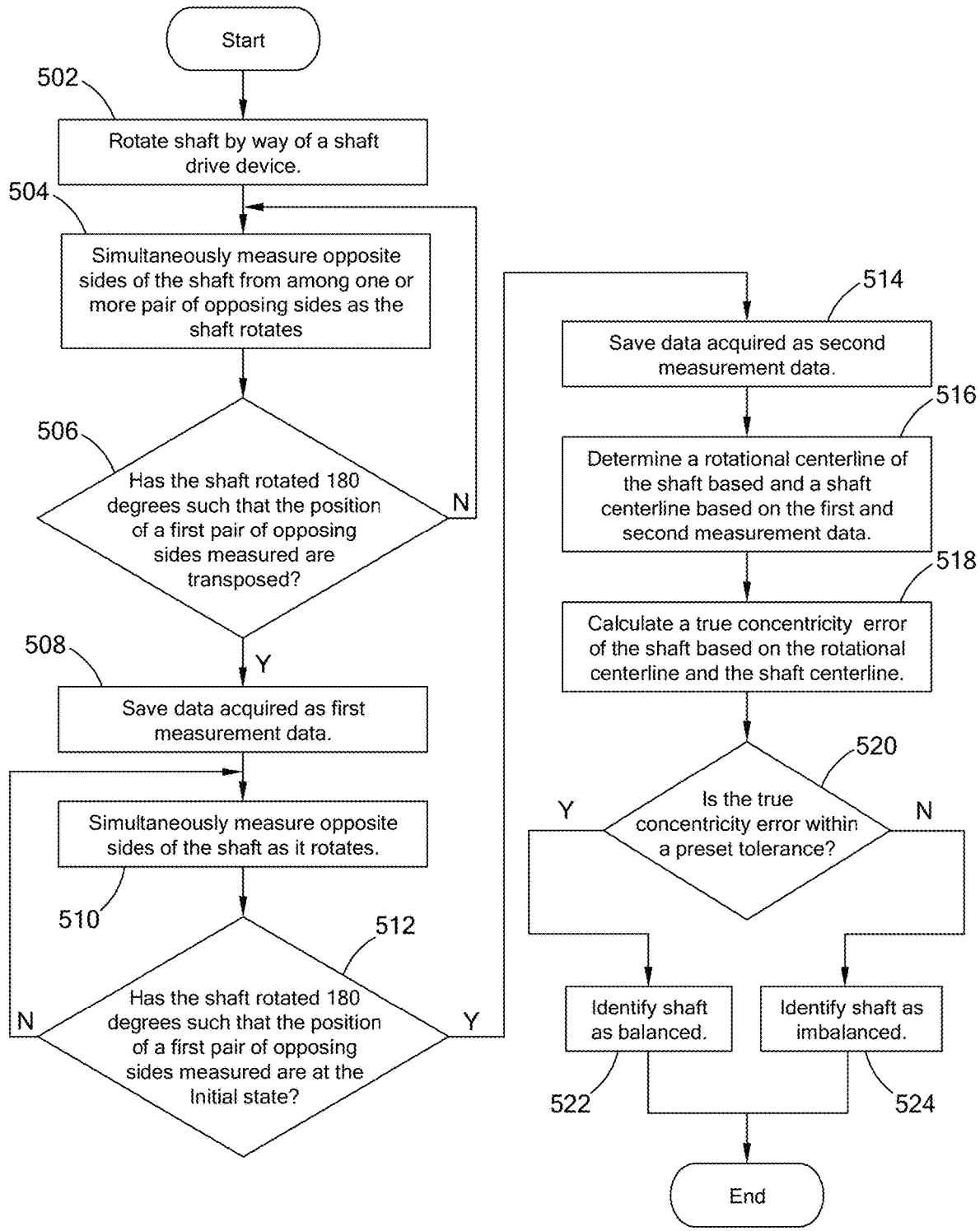
FIG. 5 is an example routine for measuring the true concentricity error in accordance with the teachings of the present disclosure.

Referring to FIG. 5, an example imbalance assessment routine for determining a true concentricity error of a shaft is provided. In one form, the routine 500 is performed by the controller and begins when the shaft is positioned in a fixture of a test cell with the portion of the shaft to be measured, like the spline portion, is arranged between two opposing sensors of the position sensor device. At 502, with the shaft positioned between two opposing sensors, the shaft is rotated. For example, the shaft is rotated by way of the shaft drive device coupled to an end of shaft different from the end being measured by the position sensor device. At 504, the position sensor device simultaneously measures opposite sides of the shaft as the shaft rotates. In one form, if the shaft has multiple pairs of opposing sides, each pair of opposing sides is measured as the sides align with the sensors of the position sensor device. In another form, a selected number of pairs are measured.

At 506, the controller determines whether the shaft has rotated 180-degrees such that the position of a first pair of opposing sides that were measured are now transposed. For example, in one form, the controller tracks the pair of opposing sides as they are measured by way of a counter, and thus, determines whether the first pair of measured splines are realigned with the sensors of the position sensor device for a second measurement. If the shaft has not rotated 180 degrees, the controller and the position sensor device continue to simultaneously measure opposite sides of the shaft as it rotates. If the shaft has rotated 180-degrees, the data acquired is saved as a first measurement data, at 508, and at 510, the system continues to simultaneously measure opposite sides of the rotating shaft. In one form, steps 508 and 510 are performed in unison such that the shaft continues to rotate and the position sensor device continues to measure opposites sides of the shaft.

At 512, the controller determines whether the shaft has rotated 180 degree such that the position of the first pair of opposing sides are at the initial state. If no, the controller and the position sensor device continue to simultaneously measure opposite sides of the shaft as it rotates. If the shaft has rotated 180-degrees, the data acquired is saved as a second measurement data, at 514. With the first measure data and the second measure data, the controller determines the rotational centerline of the shaft and the shaft centerline for each pair of measurements, at 516, as described above. For the shaft centerline, the controller may determine a shaft centerline for each measurement taken of a pair of opposing sides using one of equations 3 or 4, and thus, may calculate one or more shaft centerlines. At 518, the controller determines a true concentricity error of the shaft based on the rotational centerline and a respective shaft centerline from among the one or more shaft centerlines. For multiple shaft centerlines, the controller may further determine an average true concentricity error by averaging the errors determined.

At 520, the controller determines whether the true concentricity error is within a preset tolerance. For example, using the average true concentricity error, the controller compares the error to a preset tolerance, which may be a range or a single value. If the error is within the tolerance, the shaft can be determined as being balanced at 522. On the other hand, if the error is outside the tolerance, the shaft is identified as being imbalanced, at 524 and may be set aside for further inspection.

The routine of FIG. 5 is just one example for determining the true concentricity error based on the teaching of the present disclosure, and may be modified. For example, the controller may be configured to fully rotate the shaft multiple times to obtain multiple sets of first measure data and second measurement data, which are then used to determine an average true concentricity error. In addition, in lieu of or in addition to step step 520, the method may further includes calculating a resultant hung mass imbalance for shaft assembly using the true position error. In another variation, if a 2D optical micrometer is used, the micrometer may be configured to provide the true position error along with the angularity of the resultant axis of rotation.

The present disclosure provides a true concentricity measurement method in which the roundness of the shaft is immaterial to the calculation of the concentricity error, and thus, the true concentricity measurement is performed on a splined or non-round shaft. In addition, the method measures the functional surface of the part, rather than a surrogate surface, and excludes the form error, providing a more accurate assessment of component functionality and allowing more relaxed manufacturing tolerances than a traditional runout measurement.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for measuring a true concentricity of a shaft, the method comprising:
    rotating the shaft for at least one full rotation;
    simultaneously measuring, with a two-dimensional optical sensor, opposite sides of the shaft to acquire a first measurement data as the shaft rotates from zero to 180 degrees and a second measurement data as the shaft rotates from 180 to 360 degrees;
    determining a rotational centerline based on the first measurement data and the second measurement data;
    determining one or more shaft centerlines based on at least one of the first measurement data or the second measurement data; and
    calculating a concentricity error of the shaft based on the rotational centerline and the one or more rotating shaft centerlines,
    wherein the shaft has a spline portion with a plurality of splines, and a gear portion opposite the spline portion, the spline portion is positioned between two diametrically opposing sensors of the two-dimensional optical sensor, and further wherein the rotating the shaft further comprises driving the gear portion of the shaft to rotate the shaft.

2. The method of claim 1, wherein the simultaneously measuring the opposite side further comprises simultaneously measuring a pair of splines disposed on opposite sides of the shaft as the shaft rotates, wherein one or more pairs of splines are measured, the first measurement data includes position of each pair of splines as the shaft rotates from zero to 180 degrees, and the second measurement data includes position of each pair of splines as the shaft rotates from 180 to 360 degrees.

3. The method of claim 1 further comprising:
    measuring a maximum distance between the opposite sides of the shaft based on the first and second measurement data; and
    calculating the rotational centerline based on the maximum distance.

4. A method for measuring a true concentricity of a shaft, the method comprising:
    rotating the shaft for at least one full rotation;
    simultaneously measuring, with a two-dimensional optical sensor, opposite sides of the shaft to acquire a first measurement data as the shaft rotates from zero to 180 degrees and a second measurement data as the shaft rotates from 180 to 360 degrees;
    determining a rotational centerline based on the first measurement data and the second measurement data;
    determining one or more shaft centerlines based on at least one of the first measurement data or the second measurement data; and
    calculating a concentricity error of the shaft based on the rotational centerline and the one or more rotating shaft centerlines,
    wherein:
    the first measurement data and the second measurement data include positional measurements of the opposite sides of the rotating shaft relative to the two-dimensional optical sensor, and
    the determining one or more rotating shaft centerlines further comprises:
        measuring a first shaft diameter and a second shaft diameter, wherein the first shaft diameter is measured based on the positional measurements of the opposite sides of the shaft acquired in the first measurement data, and the second shaft diameter is measured based on the positional measurements of the opposites sides of the shaft acquired in the second measurement data;
        calculating a first shaft centerline based on the first shaft diameter, and calculating a second shaft centerline based on the second shaft diameter, and
    further wherein the concentricity error is calculated based on the first shaft centerline, the second shaft centerline, and the rotational centerline.

5. The method of claim 1 further comprising tracking movement of the shaft as the shaft is rotating and being simultaneously measured.

6. A method for measuring a true concentricity of a shaft, the method comprising:
    rotating the shaft for at least one full rotation;
    simultaneously measuring, with a two-dimensional optical sensor, opposite sides of the shaft to acquire a first measurement data as the shaft rotates from zero to 180 degrees and a second measurement data as the shaft rotates from 180 to 360 degrees;
    determining a rotational centerline based on the first measurement data and the second measurement data;
    determining one or more shaft centerlines based on at least one of the first measurement data or the second measurement data; and calculating a concentricity error of the shaft based on the rotational centerline and the one or more rotating shaft centerlines, wherein the two-dimensional optical sensor includes a light transmitter arranged on one side of the shaft and a receiver arranged on an opposite side of the shaft, the transmitter configured to emit light toward the shaft and the receiver configured to receive light not blocked by the shaft.

7. The method of claim 6, wherein the two-dimensional optical sensor is a two-dimensional optical micrometer.

8. The method of claim 6, wherein the shaft includes a spline portion with a plurality of splines and the transmitter is configured to emit light toward the spline portion and the receiver is configured to receive light not blocked by the spline portion to measure opposite sides of the spline portion.

9. The method of claim 6 further comprising determining if the concentricity error of the shaft is within a tolerance.

10. The method of claim 9 further comprising identifying the shaft as balanced if the concentricity error of the shaft is within the tolerance.

11. The method of claim 9 further comprising identifying the shaft as imbalanced if the concentricity error of the shaft is not within the tolerance.

12. The method of claim 1 further comprising determining if the concentricity error of the shaft is within a tolerance.

13. The method of claim 12 further comprising identifying the shaft as balanced if the concentricity error of the shaft is within the tolerance.

14. The method of claim 12 further comprising identifying the shaft as imbalanced if the concentricity error of the shaft is not within the tolerance.

15. The method of claim 4 further comprising determining if the concentricity error of the shaft is within a tolerance.

16. The method of claim 15 further comprising identifying the shaft as balanced if the concentricity error of the shaft is within the tolerance.

17. The method of claim 15 further comprising identifying the shaft as imbalanced if the concentricity error of the shaft is not within the tolerance.

18. The method of claim 7 further comprising determining if the concentricity error of the shaft is within a tolerance.

19. The method of claim 18 further comprising identifying the shaft as balanced if the concentricity error of the shaft is within the tolerance.

20. The method of claim 18 further comprising identifying the shaft as imbalanced if the concentricity error of the shaft is not within the tolerance.

* * * * *